Oct. 19, 1948.   H. GOLDSMITH   2,451,483
METHOD OF MAKING PROTECTIVE HELMETS
Filed June 14, 1946   2 Sheets-Sheet 1
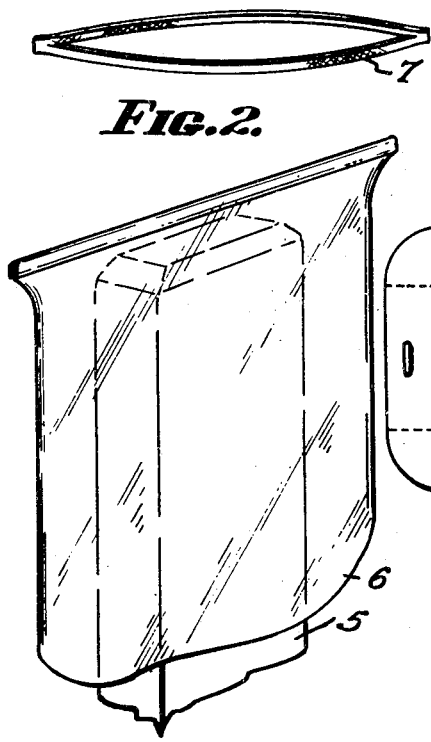
FIG. 2.
FIG. 3.
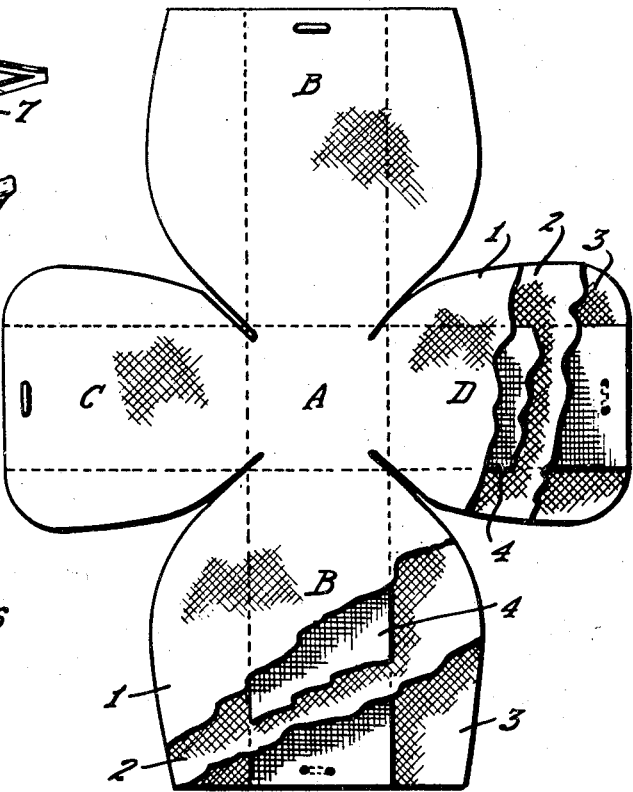
FIG. 1.
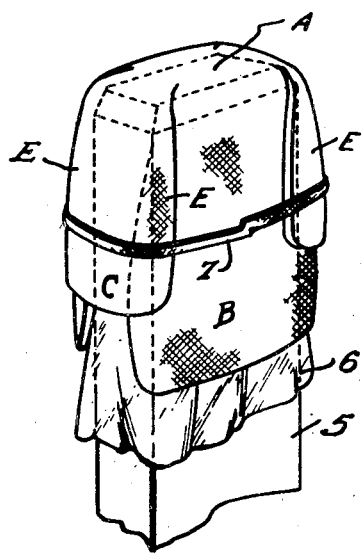
FIG. 4.
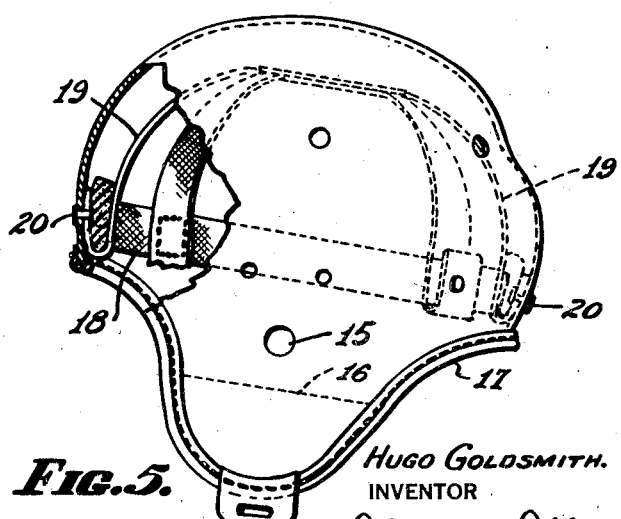
FIG. 5.
Hugo Goldsmith.
INVENTOR
BY Allen & Allen
ATTORNEYS.

Oct. 19, 1948.  H. GOLDSMITH  2,451,483
METHOD OF MAKING PROTECTIVE HELMETS
Filed June 14, 1946  2 Sheets-Sheet 2
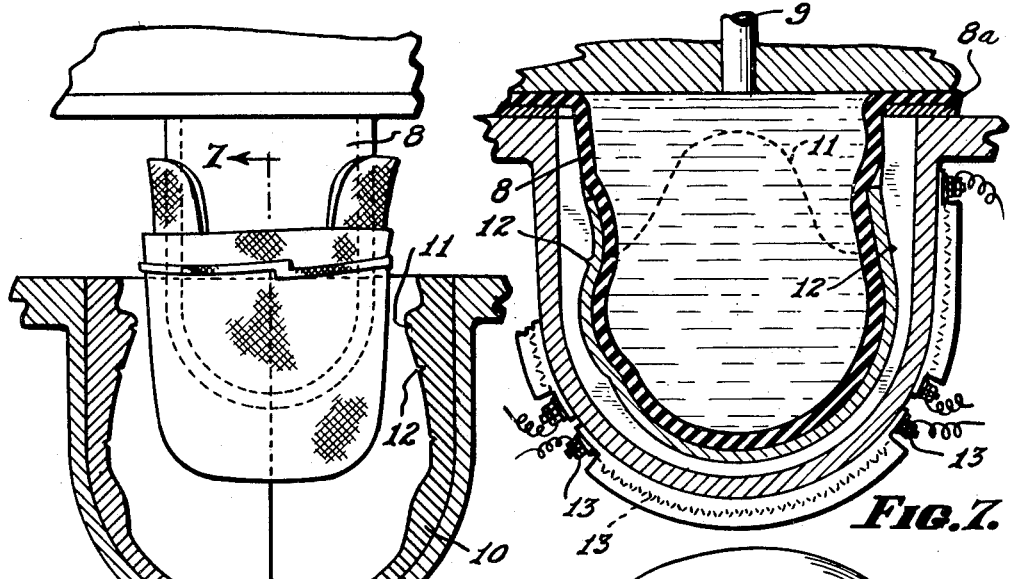
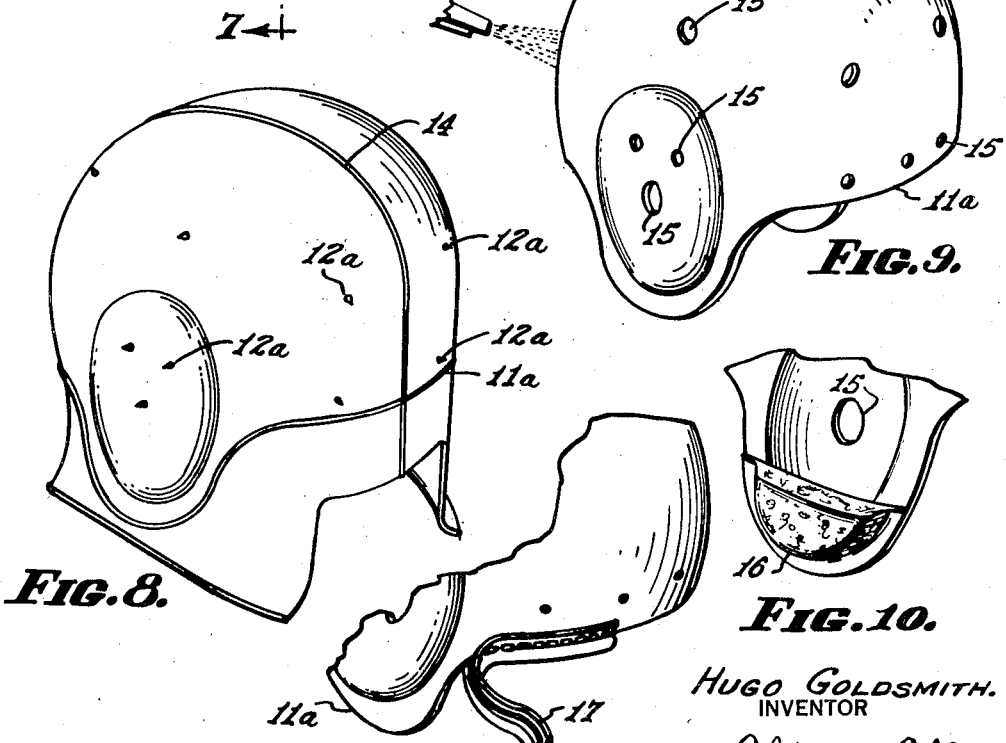
Hugo Goldsmith.
INVENTOR
BY Allen & Allen
ATTORNEYS.

Patented Oct. 19, 1948

2,451,483

UNITED STATES PATENT OFFICE 2,451,483

METHOD OF MAKING PROTECTIVE HELMETS

Hugo Goldsmith, Cincinnati, Ohio, assignor to Sport Products, Inc., Cincinnati, Ohio, a corporation of Ohio Application June 14, 1946, Serial No. 676,815

3 Claims. (Cl. 154—110)

My invention relates to making protective helmets such as football helmets as worn by the players to protect their heads from injury.

In the art there have been many developments in the manufacture of football helmets aimed to provide lightness to the wearer and at the same time adequate protection. Leather has been extensively used in the manufacture of helmets. It has never been possible to make a leather helmet in one piece because of the impracticability of molding a leather piece to fit the shape of the human head. Therefore, there have always been seam lines where overlapped pieces of leather extend from front to back. This makes a ridge from front to back providing a grip for an opponent's fingers and is otherwise undesirable.

It is the object of my invention to manufacture a one-piece helmet consisting of plies of plastic saturated material molded under heat and pressure so that the entire helmet (aside from the head fitting and protecting pads within it) is an integral formation. It is further my object to have the plies of fabric, paper, fibre glass or other heat plastic moldable sheet material, so arranged and amalgamated as to provide a maximum of strength against indentation and at the same time to provide a light and comfortable protective device for the wearer.

It is a further object of my invention to provide a helmet which will be smooth on the exterior and so provide a suitable surface for coating with enamel of different colors.

The foregoing objects and other objects, such as minimizing the cost of production, I accomplish by practicing the method as will be hereinafter described.

Referring to the drawings:

Fig. 1 is a plan view of a series of plies of heat plastic sheet material ready to be applied to a form.

Fig. 2 is a perspective view of a loop of heat plastic sheet material which holds the assembled plies in predetermined position.

Fig. 3 is a perspective view of a form showing a Cellophane bag covering the form which prevents the finished molded element from sticking to mold members.

Fig. 4 is a perspective view showing the plies of material assembled on the mold and in position to be transferred to the molding press.

Fig. 5 is a side elevation with parts in section showing the completed helmet.

Fig. 6 is an end elevation showing the molding press with the parts in disassembled position.

Fig. 7 is a sectional view along the line 7, 7 in Fig. 6.

Fig. 8 is a perspective view of the helmet immediately after molding.

Fig. 9 is a perspective view of the helmet after trimming, and perforating, and prior to the application of a surface coating.

Fig. 10 is a perspective view of a fragment of the helmet showing a preferred type of ear protecting pad.

Fig. 11 is a perspective view of a fragment of a helmet showing how edging is supplied thereto.

The fabric which I propose to employ for the manufacture of my novel helmet is composed of cotton duck saturated with thermoplastic material which when exposed to heat and pressure forms a solid body. I may further use paper material containing heat plastic material, fibre glass or other sheet material. I may also employ plies of different material for example cotton duck and fibre glass in alternating layers.

Referring to Fig. 1, I preferably employ three patterns of similar size and shape and resembling roughly the shape of a four leafed clover. Thus, in Fig. 1, I have shown the ply 1, the ply 2, and the ply 3 interspaced by strips 4 of similar plastic saturated material to provide the reinforcement of the helmet in accordance with the objects of my invention.

The plies of plastic saturated fabrics may be prepared prior to assembly on the form with the individual leaves of each ply placed in a position of registry with each underlying ply and with the strips of fabric extending in a cross formation medially of the leaves. I preferably employ three of the four leafed patterns with two cross shaped members formed of strips interspaced between each four leafed pattern.

Referring to Fig. 3, the supporting form 5 has positioned over it an inverted bag 6 of Cellophane or material with similar characteristics, and a loop strip 7 is provided for holding the assembled plies in position during the period when they are removed from the form and positioned in the press.

Referring to Fig. 1 and considering that the plies of fabric there illustrated are positioned on the form 5 and assembled as indicated in Fig. 4, it will be obvious that the crown A of the helmet will have a rectangular area wherein there are seven plies of fabric, three formed from the clover leafed patterns and four formed by the cross shaped assembly of strips.

The sides B and front and back C, D, will have five plies of fabric.

Where the side edges of the individual leaves of the clover leafed pattern intersect when the fabric pieces are folded down into the position illustrated in Fig. 4, will have six plies of fabric in overlying relationship. The strip 7 holds the assembled plies in position during transfer to the mold press.

Referring now to Figs. 6 and 7, the elements of the press consist of a rubber bag 8 supplied with liquid under pressure as from a pipe 9. The sides of the bag extend out and a gasket 8A provides a seal. By increasing the pressure of the liquid, the bag may be extended to force the plies of fabric into surface contact with the exterior mold element.

The exterior mold element 10 is shaped to provide the proper contour for the exterior of the helmet and it should be noted that the exterior element of the press has little grooves 11, 12, the groove 11 extending around the helmet as indicated in Fig. 7 and the recesses 12 forming little marking lugs to indicate the position for various perforations. Prior to closing the press the exterior surface of the positioned plies of fabric are covered with Cellophane or thin material having similar properties which prevent sticking to the exterior mold.

The exterior mold may be heated with electric resistance units as indicated at 13 or a closed steam jacket may be provided or it may be heated by burning gas.

I preferably employ a resin or other plastic material which at temperatures from 250 to 300° F. will become fluid. Using hydraulic fluid pressure of from 200 to 300 pounds, the bag 8 forces the plies of fabric against the interior surface of the outer mold member and in a period from ten to twenty minutes the entire assembled plies of fabric are molded into an integral formation.

Removing the molded helmet from the press, its condition is similar to that illustrated in Fig. 8 with the line 11a indicated and the indicating lugs 12a extending out as shown. An automatic shear is brought into contact with the molded helmet along the line 11a and the molded helmet is cut off along this line so that it appears as illustrated in Fig. 9.

Since it is preferable to employ a split mold, there may be a ridge as indicated at 14 extending medially from front to back and this is smoothed off with sand paper and perforations 15 are drilled through the helmet as indicated in Fig. 9, the size of the perforation depending on the particular purpose for which it is to be used. The helmet is then sprayed with several coats of enamel which form a hard, smooth surface. Ear pads as indicated at 16 in Fig. 10 are cemented or sewed in position to provide a soft cushion for the ears of the wearer.

Resilient edging 17 of the type illustrated and described in my copending application Serial No. 673,402, filed May 31, 1946, is then applied to the cut edges as indicated in Fig. 11.

The final assembly of the helmet is indicated in Fig. 5, wherein an oval head surrounding strap 18, having upwardly extending straps 19, is secured into position by means of rivets 20 which pass through the proper perforations 15 to hold the head support in position within the helmet. It should be noted that the straps 19 prevent the head of the wearer from actually coming into contact with the exterior shell of the helmet.

The completed helmet is substantially rigid with only enough spring to permit spreading of the sides slightly. It weighs, as far as the outer shell is concerned, less than one pound and thus provides a surprisingly light and durable helmet having remarkable strength and durability.

While I have described the specific pattern for forming the front and back (D, C) and sides (B) of five ply, the crown (A) of seven ply, and the diagonally reinforced portions (E) of six ply, it should be understood that this is a preferred arrangement, the invention consisting not in the exact number of plies, but the arrangement by which the crown portion is the most heavily reinforced, the diagonally extending portions almost as reinforced with one ply less and the front, back and sides less reinforced (with two plies less) to permit spreading for adjustment on the head of the wearer.

The structural principle involved is to have the helmet composed of resinous thermoplastic resinates wherein the front, back and sides have a minimum of plies (in the example—five), the crown, the flattest portion, is reinforced with two additional plies, and the diagonal areas formed by the overlapping of the sides of the individual leaves with one additional ply thereby tending to secure a minimum of weight and a maximum of resistance to distortion.

Modifications will readily occur to those skilled in the art.

Having thus described my invention, what I claim as new and desire to secure by Letters Patent is:

1. A method of molding protective helmets which consists in positioning three four-leafed clover leaf shaped plies of heat plastic sheet material in overlying registry on a form with strips of sheet material arranged in a cross shaped formation between the plies so that each leaf of each clover shaped ply will have a strip extending medially between said leaf and the contiguous leaf of an adjacent ply, the side edges of adjacent leaves overlapping forming four six ply bands extending diagonally of the helmet, the crown of the helmet having a rectangular area of seven plies of fabric and the front, back, and sides having five plies, securing the plies in position on the form, moving the positioned plies onto an expandable inner mold member, and expanding the member to subject the plies to sufficient heat and pressure by contact with a heated exterior mold member, contoured to determine the shape of the outer surface of the helmet, to form a light, rigid one piece helmet.

2. In the method as set forth in claim 1 impressing a groove indicating the trim line on the helmet during the heat and pressure molding step and thereafter cutting off the helmet along the indicated trim line.

3. In the method as set forth in claim 1 impressing marking lugs on the helmet during the heat and pressure molding step and thereafter drilling holes where said marking lugs occur.

HUGO GOLDSMITH.

REFERENCES CITED

The following references are of record in the file of this patent:

UNITED STATES PATENTS

| Number | Name | Date |
| --- | --- | --- |
| 2,312,333 | Gramelspacher | Mar. 2, 1943 |
| 2,351,235 | Shroyer et al. | June 13, 1944 |